Aug. 26, 1924.  1,506,069
W. LEATHERS
STABILIZER AND DIRECTION CONTROL FOR AIRCRAFT
Filed May 18, 1922   6 Sheets-Sheet 1
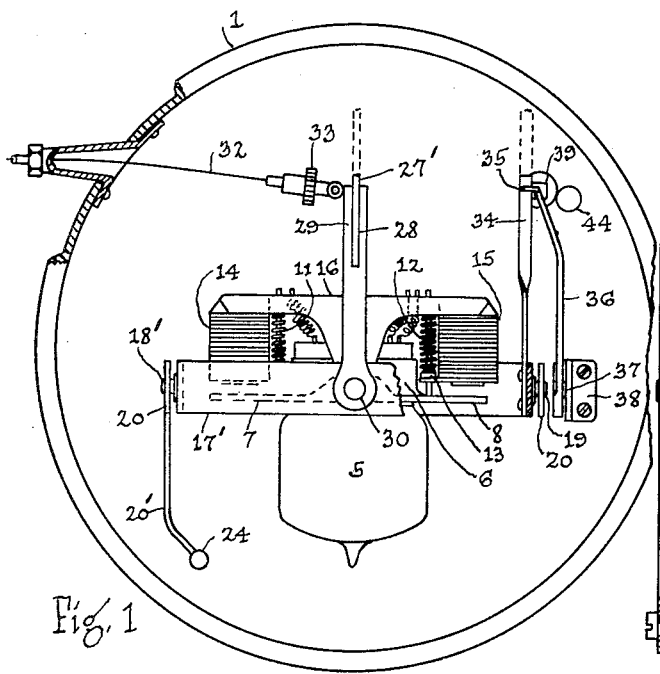
INVENTOR.
Ward Leathers

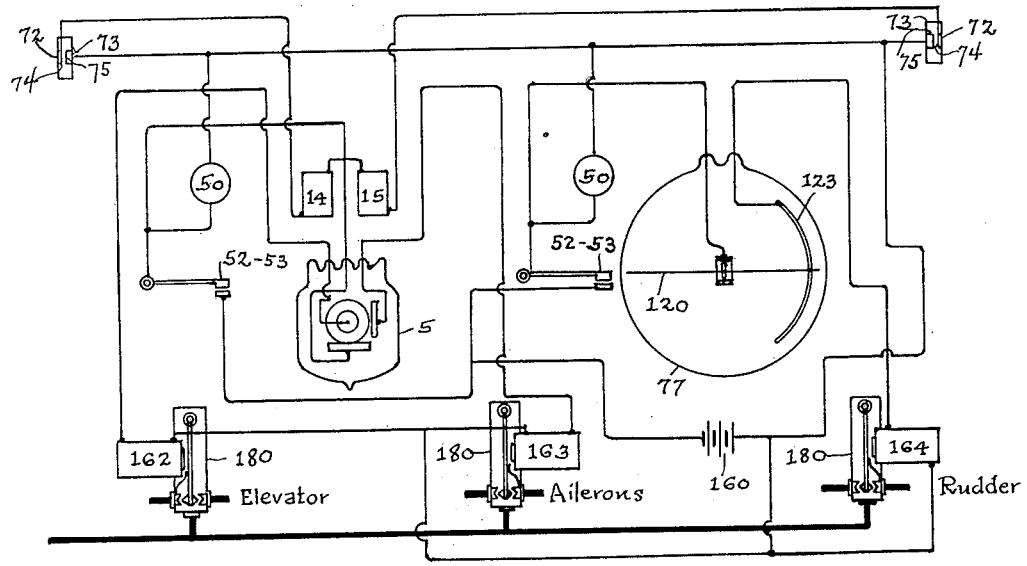
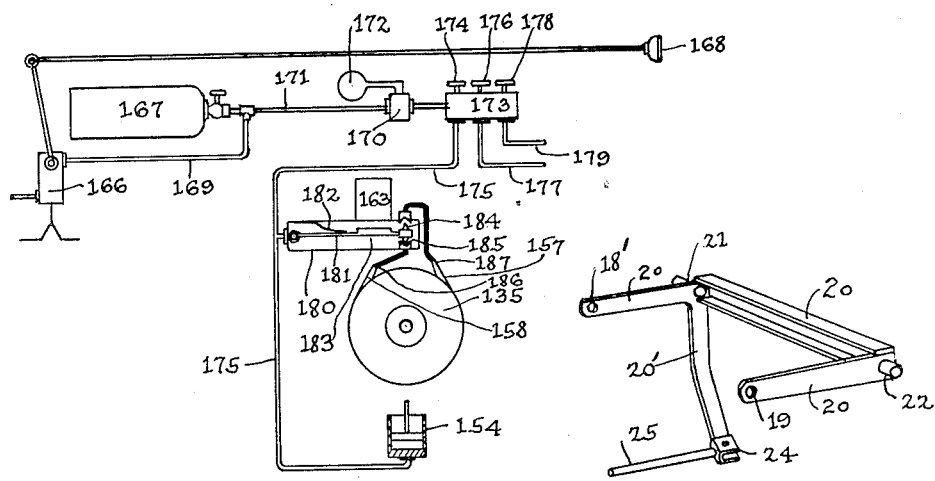

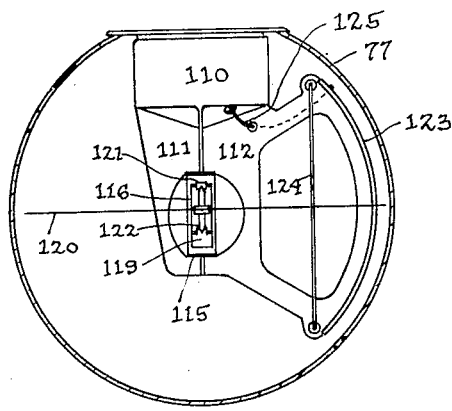
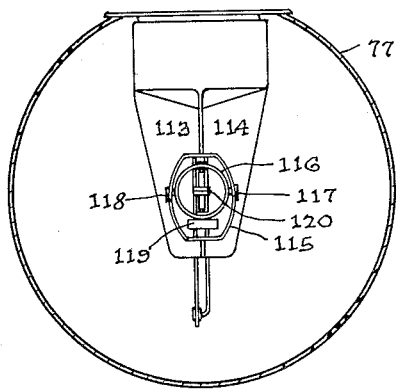
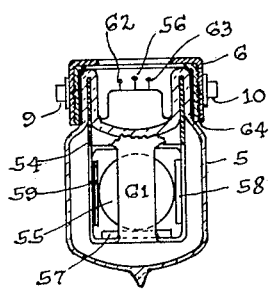
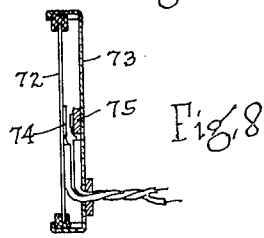
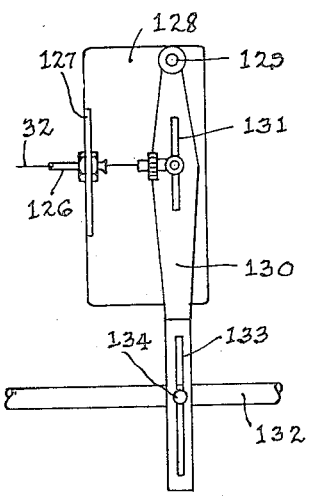
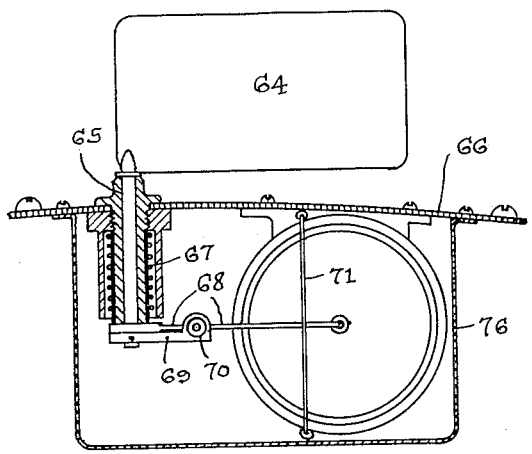

Aug. 26, 1924.

W. LEATHERS 1,506,069

STABILIZER AND DIRECTION CONTROL FOR AIRCRAFT

Filed May 18, 1922     6 Sheets-Sheet 4

INVENTOR

Ward Leathers

Aug. 26, 1924.	1,506,069
W. LEATHERS
STABILIZER AND DIRECTION CONTROL FOR AIRCRAFT
Filed May 18, 1922    6 Sheets-Sheet 5

INVENTOR.
Ward Leathers

INVENTOR.
Ward Leathers

Patented Aug. 26, 1924.

1,506,069

UNITED STATES PATENT OFFICE.

WARD LEATHERS, OF HAWORTH, NEW JERSEY.

STABILIZER AND DIRECTION CONTROL FOR AIRCRAFT.

Application filed May 18, 1922. Serial No. 561,868.

*To all whom it may concern:*

Be it known that I, WARD LEATHERS, a citizen of the United States, and residing at Haworth, New Jersey, have invented a new Stabilizer and Direction Control for Aircraft, which is fully set forth in the following specification.

The object of my invention is to produce a light, efficient stabilizer and direction contol for aircraft.

This is accomplished by the use of a gravity element and a magnetic needle. There is no pendulum, but a metal ball serves the gravity function. Both the gravity and the magnetic elements are preferably enclosed in vacuum tubes as hereinafter fully set forth.

I have found through experience that there are flying conditions when it is preferable to compensate the gravity element for inertia. This is accomplished by means of wind-stream actuators which function as hereinafter set forth.

Furthermore it is essential that the service motor or motors should be as light as possible. I accomplish this result preferably by using motive fluid turbines driven by compressed air or steam, depending upon which is most easily available.

It is highly desirable that the service motors for the several functions, lateral, longitudinal and rudder, should be separate and distinct units, since in that form they may be installed more easily in out-of-the-way places in the ship and more readily be operably connected to the control cables or rods.

In order to fully set forth my invention that those familiar with these arts may readily understand I have prepared the following specification and appended drawings thereto, of which:—

Figs. 1 and 2 are cross-sections of the stabilizer instrument taken at right angles to each other.

Fig. 3 is a front view of the stabilizer instrument.

Fig. 4 is a partial, vertical cross-section of the same.

Fig. 5 is a detail of same.

Fig. 6 is a cross-section of the stabilizer vacuum tube.

Fig. 7 is a cross-section of the wind-stream compensator.

Fig. 8 is a detail of same.

Figs. 13 and 14 are cross-sections of the rudder control vacuum tube taken at right angles to each other.

Fig. 15 is a diagrammatic view of the follow-up attachment.

Fig. 20 is a wiring diagram.

Fig. 21 is a motive fluid diagram.

Figure 9:
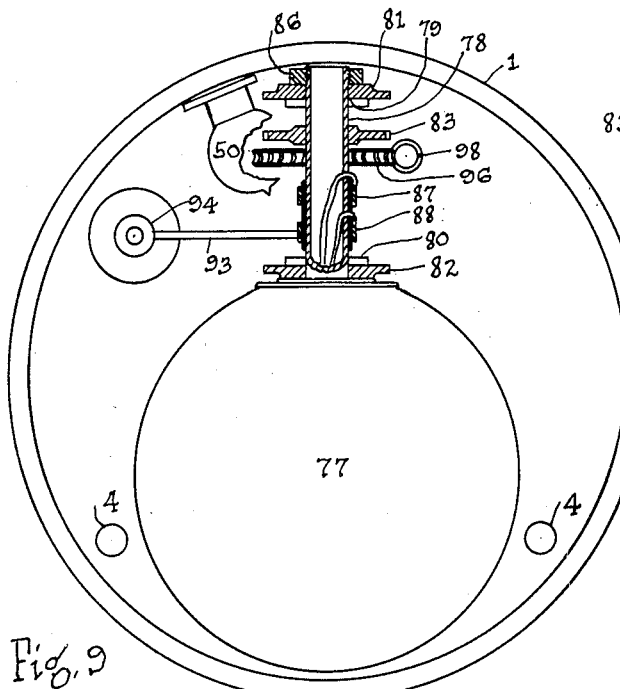
Figs. 9 and 10 are cross-sections of the direction control instrument taken at right angles to each other.

In Figs. 1, 2 and 4, 1 is a case generally similar to those used for speedometers and other dash instruments. 2 and 3 are respectively front and back plates in a post-and-plate mounting such as is common to clocks and many other instruments. 4 represents the connecting and stiffening posts located in suitable places. In this frame is suitably mounted all the operating parts as more fully set forth hereinafter. 5 is a vacuum tube, housing the gravity actuated element more fully set forth under Fig. 6. The tube 5 is mounted in a base 6 made integral with the armatures 7 and 8, the base and armatures rotatably mounted in the bearings 9 and 10. The base 6 kept in the normal position shown, by the centering springs 11 and 12. The center stem of the spring assembly, slides vertically through bearings shown at top and bottom. The collar 13, however, is integral with the stem preventing the operation of the spring below the position shown. The electromagnets 14 and 15 actuate the armatures 7 and 8 respectively, thus tilting the tube 5. This operation is for compensation for inertia—the electromagnets 14 and 15 being supplied with current by the wind-stream instruments more fully set forth under Figs. 7 and 8. The electromagnets and the centering spring assemblies are mounted on a part 16 which is rotatably and idly supported on the bearings 17 and 18. The normal position of the tube 5 with respect to the part 16 is maintained by the springs 11 and 12. The entire assembly,—tube 5, base 6, armatures 7, 8, coils 14, 15, springs 11, 12, and part 16—are supported by the bearings at 9 and 10 in a somewhat rectangular member 17'. This part, 17' is rotatably supported on bearings 18' and 19. These bearings are in a piece, the shape of which is fully shown in Fig. 5, made largely of sheet metal cut and folded as shown. 20' is a downwardly extending arm of bell crank 20 hinged at 21 and 22, in brackets 23 supported by the back-plate 3. At the bottom of arm 20' is attached at 24 a rod 25 on the outer end of which is a knob or handle 26 (Fig. 3) which is to be pulled out when the stabilizer is operated in rough air. This storm gear, as will be noted, raises upward the entire vacuum tube-coil assembly. 27 is any suitable stop. Rigidly attached to the top of part 16 is a finger 27' which is free to move in the slot 28 in the arch 29. 29 is hinged at 30 and 31 respectively to the front and back plates 2 and 3. The arch 29 is moved in its free direction by the follow-up wire 32 to which it is adjustably attached at 33. This follow-up wire is of the bowden-wire type and is attached at the other end to the aileron control cable or rod by means more fully set forth under Fig. 15. To the part 17' is rigidly attached a flat finger 34 which rests snugly but freely between two pins 35 (only one of which is shown). The pins 35 are integral or rigidly attached to the member 36 (see Figs. 1 and 4). 36 is mounted to rotate in a fore and aft plane, hinged at 37 to a rigid support piece 38 attached to the front and back plates 2 and 3. To the top of 36 is adjustably attached at 39 a follow-up wire 40, the other end of which is attached to the elevator control cable or rod by means shown in Fig. 15. This follow-up wire is also of the bowden-wire type. The bowden-wire housing 41 is attached to a part 42 provided with a rack moved fore and aft by a worm 43 turned by a shaft 44. The shaft 44 is turned by any suitable means such as an electric motor (not shown) or by a thumb nut 45 (Fig. 3). This fore and aft movement of the bowden-wire housing alters the longitudinal flight angle. There are three or more electric connections to the tube 5 all of which are flexibly led to fixed posts on the part 16 (as shown). From these posts the electric connections for the tube, and from similar posts the electric connections for the coils 14, 15, (two of which are necessary as shown by the wiring diagram Fig. 20), are led by flexible connections to any suitable position, preferably on the back plate 3.

Fig. 3 shows a front view of the stabilizing instrument in which 45 is the thumb nut by the turning of which the flight angle is altered. 46 is a face plate or dial through which openings 47 and 48 are provided to be used respectively for noting the vacuum tube and reading the flight angle. The flight angle dial 49 is made of translucent material so that it may be read at night by the light of the lamp 50 (Fig. 2) which somewhat illuminates the entire inside of the instrument. The pointer 51 is between dials 46 and 49. It is operated by any suitable gearing from the shaft 44. As shown a worm gear and a non-rotating sliding nut moves the pointer 51. 52 and 53 are "on" and "off" buttons by means of which the instrument is put into and out of operation. 26 is the "storm gear" handle. In this particular arrangement it is necessary to bring 44, 26, 52, and 53 through holes drilled in the plate-glass front.

Fig. 5 shows in perspective the port 20, the function and location of which is described under Figs. 1 and 2.

Fig. 6 is a cross-section of the stabilizer vacuum tube 5 of Figs. 1 to 4. In Figs. 6, 5 is a glass tube as is common to electric lamps and other vacuum tubes. 54 is a cage of suitable material, preferably of metal, in which is mounted a ball 55 of suitable metal such as nickel, silver, platinum, or with a surfacing of such suitable electric contact metal. The cage 54 may be used as an electrical conductor, electrically joined to one of the lead-ins of the tube as at 56. The base plate 57 on which the ball 55 rests, is of hard metal smoothly ground and so mounted that its plane is perpendicular to the vertical axis of the tube. This plate is in electrical contact with cage 54. 58 is merely a back-stop and may or may not be in electrical contact with the cage 54. 59 however, is a contact piece of suitable contact metal such as platinum and is insulated from the cage. There is just sufficient clearance between the ball 55 and the stop 58 and the ball 55 and the contact 59 so that their total separation is a greater gap than the current will cross under the electrical and dielectrical conditions existing in the tube. This clearance is not shown but it may preferably be but a few thousandths of an inch. Fore and aft there are similar members to 58 and 59 with similar functions and clearances. These may be called 60 and 61 (60 not shown), 61 is insulated in a manner similar to 59. 59 is electrically connected to the lead-in 62 and 61 is similarly connected to the lead-in 63. The tube base 64 is suitably mounted in the plug 6 as by the threading shown. Current provided at 56 comes from the tube at 62 when the tube is so tipped that the ball 55 comes in contact with the insulating member 59. Current, on the contrary, comes from the tube at 63 when the tube is so tipped that the ball 55 makes electrical contact with the insulated contact 61.

Fig. 7 shows the wind-stream directional compensator which compensates for the inertia of the ball 55, when the ship is not traveling in a course coincidental with its longitudinal or flying axis. This instrument is mounted on the wing of an airplane out of the wind disturbance caused by the propeller, preferably on the upper or lower side of the top airfoil. (Illustration shows instrument for top-side mounting.) On a single engined ship it has been found preferable to use two such instruments of the single contact type illustrated, one on each side of the propeller, at a safe distance from the propeller disturbance. 64 is a stiff flag of suitable material such as aluminum, rotatably mounted in the bearing 65. The part 65 is shown suitably attached to a frame-plate 66. About this bearing member is shown an electric coil or steam pipe coil 67 for heating the shaft, thus preventing freezing. This heating element may or may not be used as desired. At the lower end of the shaft, integral with the flag 64 is attached rotatably and idly an arm 68, below which is attached to said shaft an arm 69 provided with two adjusting screws as at 70. These screws hold tightly the arm 68 in an adjustable position, causing the two arms 68 and 69 to rotate as one with the flag 64. Mounted on the plate 66 is a diaphragm of flexible material such as thin mica or bakelite, the construction and function of which is more fully described under Fig. 8. The arm 68 moves freely between the diaphragm and a back-stop 71. When the side-slip of the airplane is sufficient, the end of the arm 68 presses on the diaphragm and an electrical contact is made inside the chamber formed by the diaphragm 72 and the enclosure 73 of Fig. 8.

Fig. 8 is a cross-section of the diaphragm assembly. Here 72 is the diaphragm and 73 is an enclosure for the same. Between 72 and 73 are mounted electrical contacts 74 and 75. When the diaphragm is sufficiently compressed by the arm 68 the circuit is closed, which permits a flow of current through the corresponding coil such as 14 in Fig. 1 (see Fig. 20). Thus the contacts are entirely housed from the weather and are situated in a practically air-tight housing. In Fig. 7 the entire housing 76 is recessed into the airfoil so that only the flag projects. Naturally one flag may be provided with two diaphragms on opposite sides of the arm 68 so that both coils (14, 15 in Fig. 1) may be operated therefrom.

Figure 10:
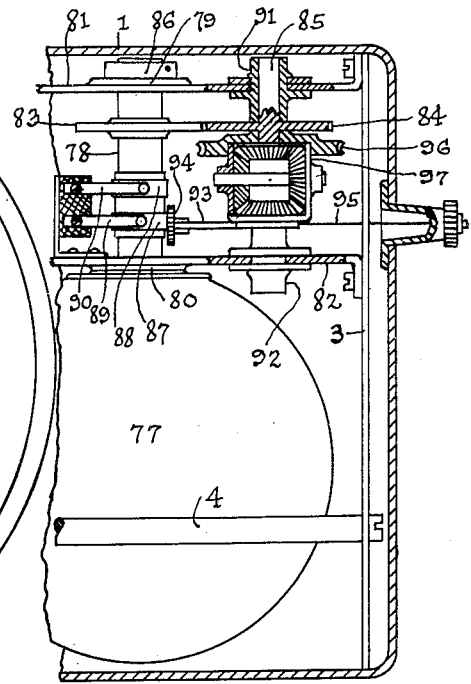

Figs. 9 and 10 show the construction of the rudder control instrument. Here 77 is a vacuum tube containing the magnetic element by means of which the ship is piloted on its course. This tube is more fully described under Figs. 12, 13 and 14. The tube 77 is rigidly mounted on the end of the hollow shaft 78 which rotates in bearings 79 and 80, respectively in the members 81 and 82 which are attached to the front and back plates 2 and 3, (shown in Fig. 1). Attached to the shaft 78 is a gear 83 which meshes (one to one) with a gear 84 rigidly attached to a shaft 85. The shaft 78 is further provided with a fixed collar 86 and with electrical collector rings 87 and 88. These latter are connected to insulated conductors joined to the lead-ins of the tube 77. These collector rings are provided with brushes 89 and 90. The shaft 85 is carried on a bearing piece 91 held by 81. The shaft 85 is further rigidly attached to the upper of four mitre gears shown, which form a differential. In the lower part of the differential is another shaft similar to 85. It is held in a bearing piece 92 by the frame member 82. To this shaft is attached the bottom mitre gear, and the arm 93, which, in Fig. 10, extends slightly away from the observer and slightly toward the front of the instrument. To this arm at 94 is adjustably attached the rudder follow-up wire 95 in a manner similar to those in the stabilizer instrument. The right and left mitre gears are idle on the cross shaft. On the shaft 85 is an idle worm gear 96 to which is rigidly attached the differential cage 97 which is idle on its lower bearing. Thus when the worm gear 96 is held from rotating, movement of the arm 93 rotates the vacuum tube 77. The worm gear 96 is provided with a worm 98 turned by any suitable means such as an electric motor or by the thumb nut 99 on the front of the instrument (see Fig. 11). When thumb nut 99 is turned it turns the worm gear 96 rotating the cage and differentially altering the direction of flight.

Figure 11:
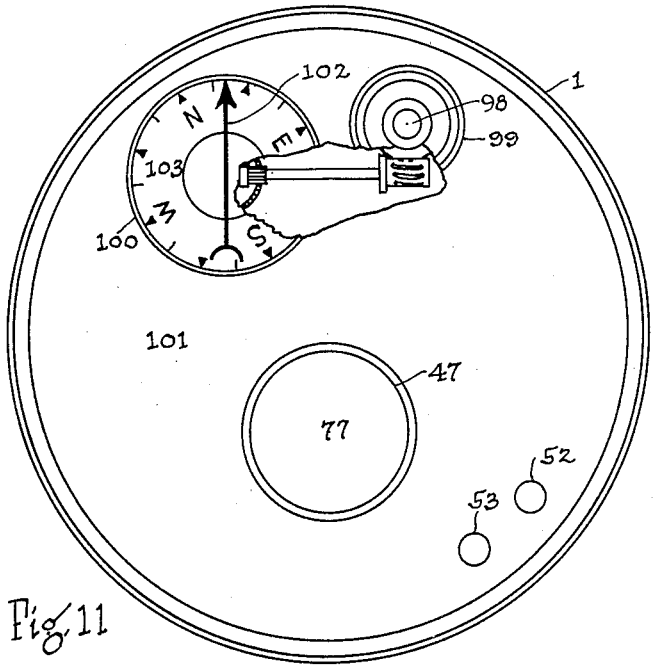
Fig. 11 is a front view of the direction control instrument.

Fig. 11 shows a front view of the rudder control instrument. 47 shows an opening through the dial through which the vacuum tube is visible. 100 shows an opening in the dial through which the direction indicator is visible. 101 is the dial under plate-glass as is common to dash instruments. The pointer 102 is attached to or painted on a piece of plain glass back of which rotates the dial 103 which is made of translucent material and lighted by the lamp 50 on the inside of the case. The dial 103 is rotated from the shaft 98 by any suitable means such as the worm gear and right angled gear indicated. This dial shows the direction of flight while the instrument is controlling the direction of the ship in flight. It further makes it possible, by comparing it with an outside compass the points on the dial of which have been used as a guide and making the compass points on dial 103 to approximately correspond, to set the instrument in such a manner that when the instrument is put in control of the ship the direction of travel will continue to be approximately that of the ship when such change of control took place.

Figure 12:
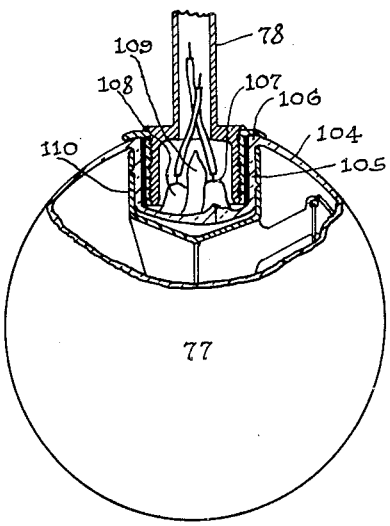
Fig. 12 is a partial cross-section of the rudder control vacuum tube, and base for same.

Fig. 12 is a partial cross-section of the vacuum tube 77 in which the base construction is shown. 104 is a glass tube as is common to electric lamps and other vacuum tubes. 105 is a cylindrical glass portion of the tube which is closed by fusing at 106 in the usual manner. Inside 105 are pinched-in lead-ins 107 and 108 and the exhaustion seal-off tube 109. The actuating parts inside the tube are supported by a metal part 110 surrounding 105 and joined to it in any suitable manner such as by leaving perforations in the metal and pressing the glass into these while the glass is at fusing temperature. Naturally the metal and the glass should have similar coefficients of expansion. Such suitable metal used with common glass would be platinate (a combination of iron and nickel).

In Figs. 13 and 14 (vertical cross-sections taken at right angles to each other) I have shown the construction of the rudder control vacuum tube. Here 77 is the glass tube. 110 is the metal base attachment to which the metal fins 111, 112, 113, 114 are welded, soldered or otherwise made integral. 115 is a fixed ring of metal of irregular shape as shown. In 115 the ring 116 is supported by loose bearings at 117 and 118. The ring 116 is provided with a weight 119 at the bottom. The magnetic needle 120 is freely held by the bearings 121 and 122 in 116. The needle is free to rotate a few degrees between the metal segment 123 and the backstop 124. 123 is made of suitable electric contact metal such as platinum and is insulated from although held by 112. The electrical connection shown at 125 joins 123 with one of the lead-ins shown in Fig. 12. The other lead-in is electrically joined to 110 from which current is readily led to the needle 120. Since the needle points to the magnetic north, rotating the tube 77 will make and break a circuit impressed upon the lead-ins shown in Fig. 12.

Fig. 15 shows how the follow-up wires 32 and 40 of the stabilizer instrument and the follow-up wire 95 of the rudder control instrument are attached to the aileron, elevator and rudder control cables or rods. The wire 32 serves to illustrate all three. 32 is bowden-type in a snug tube 126. The tube 126 is attached to a bracket 127 on a support plate 128 and the point of support may be adjusted upward or downward. Hinged at 129 is an arm 130, provided with a slot 131 in which is adjustably mounted a holder for the end of the wire 32. At the lower end of the arm 130 is a loop of metal surrounding the control rod or cable 132. In this loop is a slot 133 in which engages a pin 134 attached to 132. 132 moves only lengthwise while the slot 133 permits such movement as it moves in an arc about 129.

Figure 16:
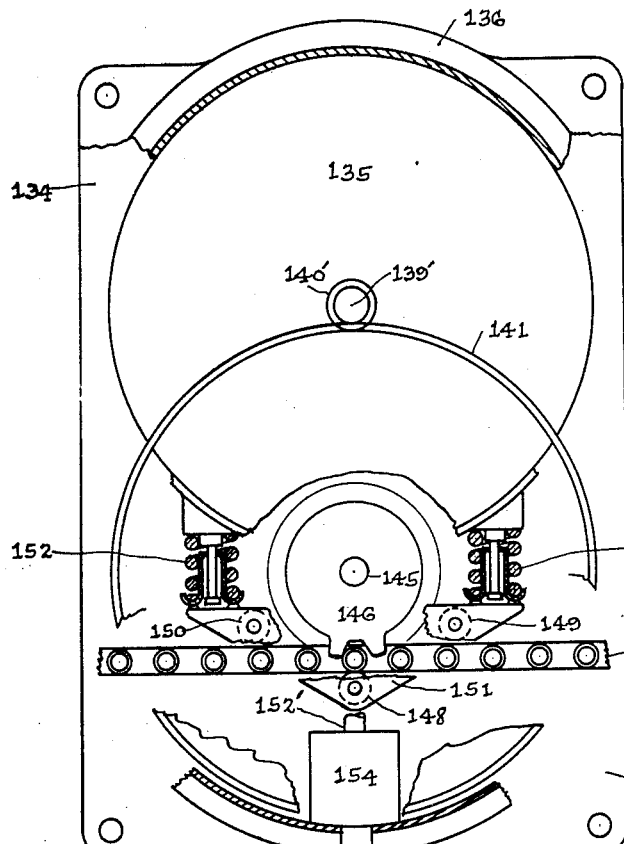
Fig. 16 is a partially sectioned diagrammatic front view of a service motor.
Figure 17:
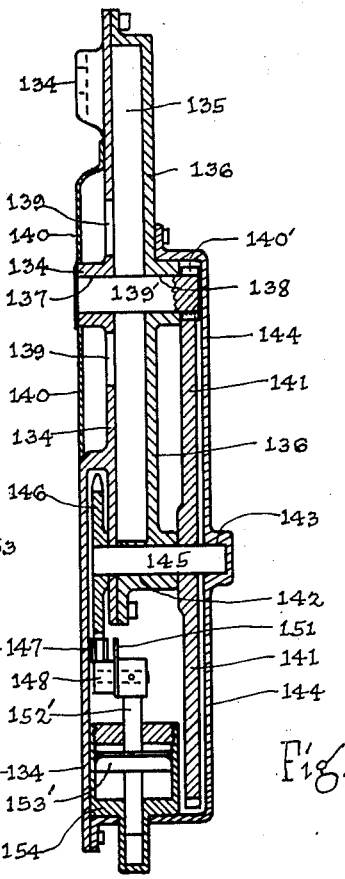
Fig. 17 is a cross-section of same.

Figs. 16 and 17 illustrate the service motor. Fig. 16 is partially sectioned and partially diagrammatic. Fig. 17 is a vertical cross-section taken at right angles to Fig. 16. While all the figures heretofore described, except Fig. 15, are practically the actual size of the devices, Figs. 16 and 17 are a little smaller than actual size. The service motors are made almost entirely of aluminum alloys. There is one such service motor used for each of the controls of the ship and they may be mounted in any convenient, out-of-the-way place in the fuselage or wings or in the nacellé of an airship. The base or mounting plate 134 is also the side plate of the turbine 135 which is provided with another side plate 136. The bearings for the turbine 135 are in 134 and 136 at 137 and 138. The turbine exhaust is at 139 where the exhaust may be collected if desired in a collector 140 from which it may be led to any desired outlet. In the case of steam driven aircraft these turbines will naturally be driven by steam, collected in 140 and led from thence to the condenser. The turbine may be of any suitable reversible type, preferably corrugated disc further illustrated and described under Figs. 18 and 19. The turbine shaft 139' is provided with a subtended gear at 140' which engages a gear 141 with bearings at 142 in 136 and at 143 in the case cover 144. The gear 141 drives the shaft 145 which is provided on the other end with a sprocket 146 which engages a drive chain 147. The chain 147 is held between the rollers 148, 149 and 150—all three rollers being held in a spider 151. At 152 and 153 I have provided springs which press downward on the spider 151 and hence, by means of the rollers 149 and 150, when permitted will release the chain 147 from engagement with the sprocket 146. To the bottom of the spider 151 is attached a plunger 152' connected to a piston 153' in a cylinder 154. When compressed air (or other gas or liquid under pressure) is admitted to cylinder 154 the plunger 152' raises the spider 151, which by means of the roller 148 forces the chain into engagement with the sprocket. When the pressure is released the chain 147 and sprocket 146 are disengaged. The chain 147 is attached to the control rod or cable of the ship in such manner that they move together in both directions.

Figure 18:
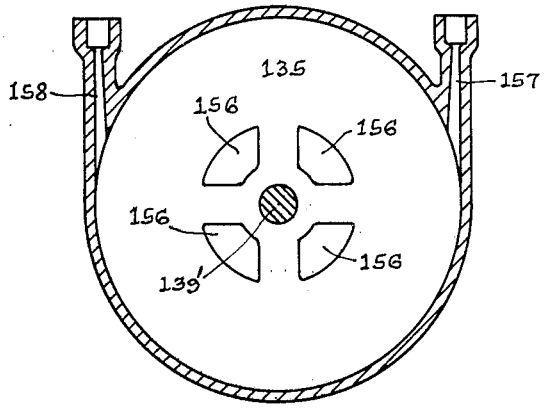
Figs. 18 and 19 are views of a turbine for same.
Figure 19:
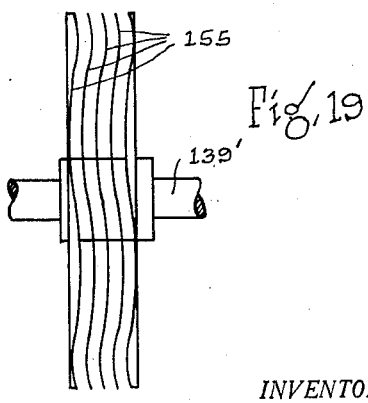

Figs. 18 and 19 illustrate a suitable type of motive fluid turbine for service motor use. Naturally other prime mover may be used. The turbine 135 is composed of a series of corrugated discs 155 rigidly mounted on the shaft 139' and with exhaust ports cut therein as shown at 156. The turbine is provided with two tangential nozzles 157, 158 for running the turbine in both directions. The valve mechanism for admitting motive fluid to these nozzles is illustrated in Fig. 21.

Fig. 20 is a wiring diagram indicating clearly the entire electrical functioning of the stabilizer, the rudder control, and the service motors for the same. A single battery 160 may furnish the current for the entire system. Naturally it is essential for continued operation to have the battery floated on a generator line. When electrical circuits are closed at 52—53 and 52—53 the system is set functioning electrically. At 162, 163 and 164 I have shown the electromagnets by which the stabilizer and rudder control instruments actuate the service motors. These magnets and the valves they operate (more fully described under Fig. 21) are mounted near or preferably on the service motors and it should be noted have no electrical contacts which might be subject to sparking—a very objectionable thing on a service motor.

Fig. 21 is a motive fluid diagram. 166 is an air compressor driven by any suitable prime mover such as an internal combustion engine, or a steam engine or steam turbine on a steam-driven craft. In case of steam, 166 may be an automatic reduction valve. 166 is provided with an automatic unloader which relieves the compressor when the pressure in the flask 167 has reached the predetermined pressure for which the unloader is set. I have further provided a manually or locally or distantly controlled means 168 of changing the critical point at which the unloader operates. Thus, for example, by pulling on handle 168 the maintained pressure in the flask 167 may be altered from say 30 pounds to 70 pounds. Air from 166 is led to the flask 167 through the pipe 169. From the flask 167 air is led to the valve 170 through the pipe 171. 170 is a shut-off valve provided with a handle 172 so constructed that, when located near the elbow of the operator of the aircraft, the mere bumping of it with the elbow will shut off the motive fluid supply to all the service motors and to all the cylinders 154 which hold the aircraft control connections in engagement with the service motors. It will be noted that with the closing of 172, 154 will bleed-off instantly through an open turbine nozzle. From 170 motive fluid is led to a group of valves 173. These are simple one-way valves each serving a separate service motor. These valves are naturally in a location handy to the operator. The valve 174 and the pipe 175 serve the turbine shown in the diagram which may control such a function as the lateral stability by means of the ailerons; the valve 176 and the pipe 177 serve the elevator service motor, and the valve 178 and pipe 179 serve the rudder service motor. This makes all three selective at the will of the operator. All three operate as noted in Fig. 20 in the following manner: When the valve 174 is opened by the operator, motive fluid by means of 175 is supplied to a pressure chest 180 in which is a valve arm 181 resisted by a spring 182, an armature 183 and needle valves 184 and 185 pointed in opposite directions. The spring 182 holds 185 shut and 184 open. When current flows through the coil 163 the armature 183 holds 184 closed and 185 open. At 186 and 187 motive fluid is supplied to the nozzles 157 and 158 actuating the turbine (as shown in Fig. 18) first in one direction then in the other with constantly reversing operation.

It will be remembered that the turbine 135, when the chain 147 engages the sprocket 146, moves the control cable or rod 132. To the control cable is attached the follow-up wire (Fig. 15) which tilts the vacuum tube 5 in such direction that when current is supplied to coil 163 the circuit will be broken, and when current is not supplied the circuit will be closed. The rudder control works similarly, the magnetic needle 120 making and breaking the circuit as the vacuum tube 77 is rotated by its follow-up, driven back and forth by the control cable which is in turn driven back and forth by its service motor.

Figure 22:
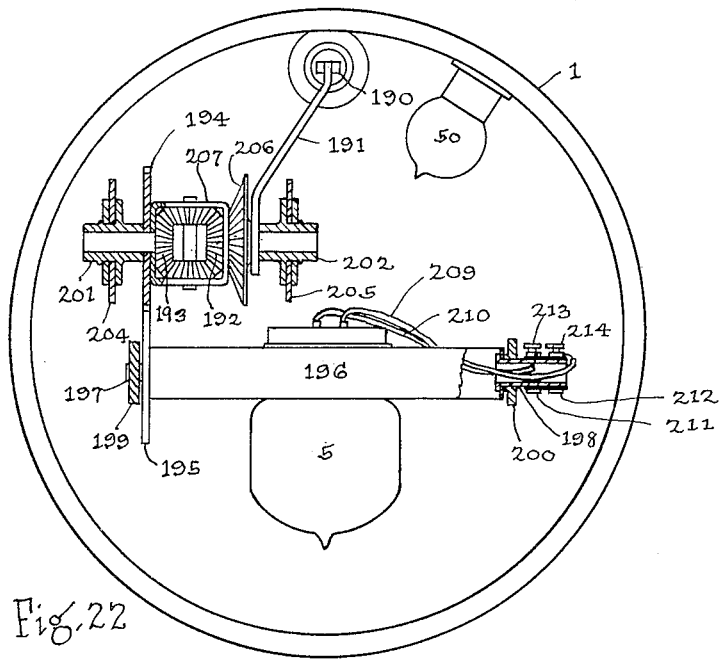
Fig. 22 is a partially sectioned view of a stabilizer for dirigibles.
Figure 23:
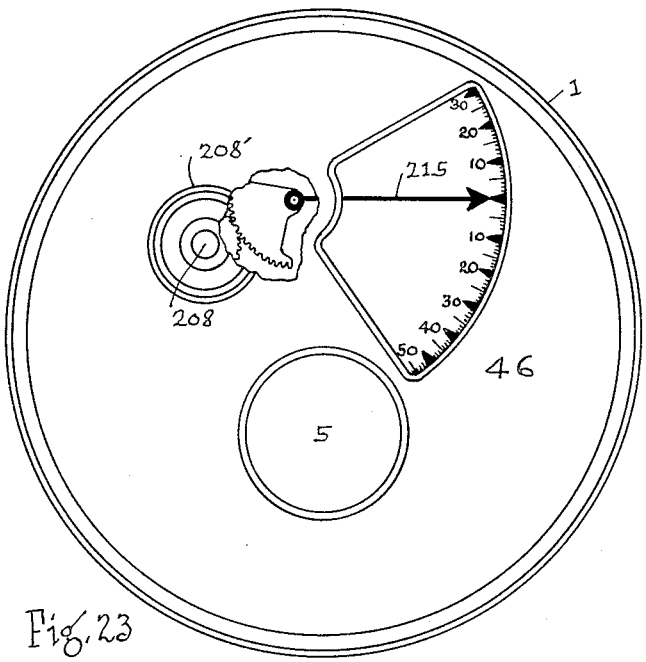
Fig. 23 is a front view of same.

In Figs. 22 and 23 I have illustrated an elevator control instrument for use on dirigibles. The rudder control instrument described is as useful on such craft as on airplanes, but the stabilizer instrument needs modification because the dirigible needs no lateral control (having no ailerons) and requires wider range of flight angles for normal operation because of its sluggish action. Figs. 22 and 23 show such longitudinal stabilizer.

Fig. 22 is a somewhat diagrammatic instrument using similar mountings and post-and-plate frame shown in Figs. 1 and 2. The parts and operation throughout are similar to corresponding parts and functions described under the airplane stabilizer except for the following changes: The tube 5 omits the contact 59 (lateral) using only 61 (longitudinal) (Fig. 6). It is rotated only fore and aft by a follow-up attached at 190 to the arm 191 which turns the gear 192 in the differential shown. By means of the intermediate gears it drives the gear 193 attached to the same shaft as the gear 194 which meshes with the gear 195 attached to the vacuum tube holder 196 which has bearings at 197 and 198 held in supports 199 and 200 extending between the front and back plates. The bearings at 201 and 202 are supported on frame members 204 and 205 also attached to front and back plates. The bevel gear 206 is attached to the cage 207. It is in mesh (one to two) with a bevel gear, not shown, on the end of a shaft 208, the other end of which is furnished with a thumb nut 208'. (Fig. 23.) The tube 5 requires but two electrical leads shown at 209 and 210, led to collector rings at 211 and 212. These are provided with brushes 213 and 214.

In Fig. 23, 46 is the dial with openings to show the tube and indicator dial. The pointer 215 is shown geared to the shaft 208 (one to two) thus giving readings on the flight angle.

Having fully set forth my invention, I wish it understood that there are many possible modifications and re-arrangements of these elements and parts too numerous to describe which fall within the spirit of my invention.

I claim:—

1. In an automatic controller for aircraft a control connection, a follow-up mechanism, a rotatable electric contact tube, a source of electric current, a reversible service motor, electrical means in circuit with said contact tube and said source of electric current, said service motor being reversibly controllable by said electrical means and a relation altering mechanism, said relation altering mechanism being adapted to alter the relation between said rotatable electric contact tube and said control connection and said follow-up mechanism.

2. In a stabilizer for aircraft the combination of a gravity actuated member, a rotatable gravity member container, and a control member with a follow-up mechanism, said gravity member container being operably connected to said control member by said follow-up mechanism.

3. In a stabilizer for aircraft the combination of a free moving, ball gravity actuated member, a rotatable, electrically connected gravity member container and a control member with a follow-up mechanism, said container being rotatably connected to said control member by said follow-up mechanism.

4. In a stabilizer for aircraft the combination of a gravity element, a gravity element container, rotatable support for said container, an electrically insulated contact piece, said contact piece being located in said container, a source of electric current, an electric circuit, said circuit being respectively closed or opened when said gravity element touches or moves away from said contact piece and a control member with a follow-up mechanism, said follow-up mechanism being operably connected to said container and to said control member, said container being adapted to be rotated by means of said follow-up mechanism.

5. In a stabilizer for airplanes the combination of a gravity element, a gravity element container, supporting means for said container, said supporting means being rotatable in transverse and longitudinal planes, two electrically insulated contact pieces, said contact pieces being located respectively in a transverse plane and a longitudinal plane in said container, a source of electric current, a lateral control member, a longitudinal control member, and electric circuits associated respectively with said contact pieces, said circuits being respectively closed or opened by said gravity member, with two follow-up mechanisms, said follow-up mechanisms being respectively associated with said lateral and longitudinal control members.

6. In a stabilizer for aircraft, in combination a gravity element, a gravity element container, a rotatable support for said container, a follow-up mechanism, a reversible service motor, a source of electric current, an electric circuit closed and opened by said gravity member and an aircraft control member, said service motor being controlled by said electric circuit, said control member being driven by said service motor, said control member rotating said container through said follow-up mechanism.

7. In an aircraft direction control, the combination of a magnetic compass needle, a compass needle container, supporting means for said needle container, an insulated contact piece located in said container, a source of electric current, an electric circuit, and a rudder control member with a follow-up mechanism, said follow-up mechanism being operably connected to said needle container and said rudder control member, said needle container being rotatable in a horizontal plane by said follow-up mechanism.

8. In a stabilizer and direction control for aircraft the combination of a gravity element in a container, a magnetic compass needle in a container, with lateral, longitudinal and rudder control members and respective follow-up mechanisms, said lateral and longitudinal follow-up mechanisms being operably connected to said gravity container, said rudder control follow-up mechanism being operably connected to said needle container.

9. In a control apparatus for aircraft, a reversible motive fluid turbine, a connection for motive fluid to said turbine, a stop valve on said motive fluid connection, speed reduction gearing and a sprocket wheel in association with said turbine, a sprocket chain, a motive fluid pressure chest in association with said turbine and said connection to said turbine, said pressure chest being provided with two valves communicating respectively with opposite sides of said turbine, said valves being reversibly one open and the other closed, electrical means for valve reversing associated with said pressure chest, a motive fluid cylinder and piston, a motive fluid connection from said pressure chest to said cylinder and a roller surfaced bracket member in association with said piston and engaging said sprocket chain in combination with an aircraft control connection, said sprocket chain being operably connected to said control connection, a rotatable electrical contact control mechanism and a follow-up mechanism, said follow-up mechanism being attached to said control connection and to said electrical contact control mechanism.

10. A stabilizing device for aircraft vehicles comprising a container, a single longitudinal, electrical contact member, a single transverse electrical contact member, an unstable single gravity element freely supported on and within said container, and adapted to connect one or both of said electrical contacts with a source of electromotive force, guiding means for said vehicle and operative connections set in motion by the closure or breaking of said electrical contacts to drive said guiding means.

11. In an automatic controller for aircraft, a control connection, a follow-up mechanism, a motion reduction means, said follow-up mechanism being attached to said control connection through said motion reduction means, an electric contact tube, a source of electric current, a differential, a reversible service motor, electrical means in circuit with said contact tube for reversibly controlling said service motor, said differential being adapted to alter the relations between said follow-up mechanism and said electric contact tube.

WARD LEATHERS.